United States Patent [19]

Aoyama: Tatsuya

[11] Patent Number: 5,181,103
[45] Date of Patent: Jan. 19, 1993

[54] WHITE BALANCE ADJUSTING SYSTEM FOR A COLOR TELEVISION SYSTEM
[75] Inventor: Aoyama: Tatsuya, Tokyo, Japan
[73] Assignee: Pioneer Electronic Corp., Tokyo, Japan
[21] Appl. No.: 811,334
[22] Filed: Dec. 20, 1991
[30] Foreign Application Priority Data
   Jun. 13, 1991 [JP] Japan .................. 3-168824
[51] Int. Cl.⁵ .............. H04N 9/16; H04N 9/18; H04N 9/31; H04N 5/74
[52] U.S. Cl. ...................... 358/64; 358/60; 358/29
[58] Field of Search .......... 358/29, 60, 64, 72, 358/74, 61, 62; 353/30, 31, 69

[56] References Cited
U.S. PATENT DOCUMENTS

| 4,219,843 | 8/1980 | Takahashi | 358/60 |
| 4,394,089 | 7/1983 | McIntosh et al. | 358/88 |
| 4,599,642 | 7/1986 | Willis | 358/65 |
| 4,701,788 | 10/1987 | Desjardins | 358/64 |

FOREIGN PATENT DOCUMENTS

| 60-212089 | 10/1985 | Japan | 358/29 |
| 62-038088 | 2/1987 | Japan . | |
| 63-018892 | 1/1988 | Japan . | |
| 63-68380 | 11/1988 | Japan . | |

Primary Examiner—James J. Groody
Assistant Examiner—S. Metjahic
Attorney, Agent, or Firm—Nikaido, Marmelstein, Murray & Oram

[57] ABSTRACT

A white balance adjusting system for a color television system has three CRTs for projecting beams of three primary colors, and a color control circut for controlling outputs of the three CRTs. Three sensors are provided adjacent each CRT for detecting quantity of each color light. A memory stores three reference quantities of respective color lights for obtaining a white balance. Each detected quantity of the color light is compared with the reference quantity by a computer. The color control circuit is operated so as to reduce the difference obtained by the comparator to a predetermined value.

4 Claims, 8 Drawing Sheets

WHITE BALANCE ADJUSTING SYSTEM FOR A COLOR TELEVISION SYSTEM

BACKGROUND OF THE INVENTION

The present invention relates to a white balance adjusting circuit for a projection television system having three CRTs, and more particularly to a white balance adjusting system for automatically controlling balance of color when quantities of light of the three primary colors decrease with time.

In recent years, in order to provide a wider screen for a television system, it has become common to employ a projection television system.

Figure 4:
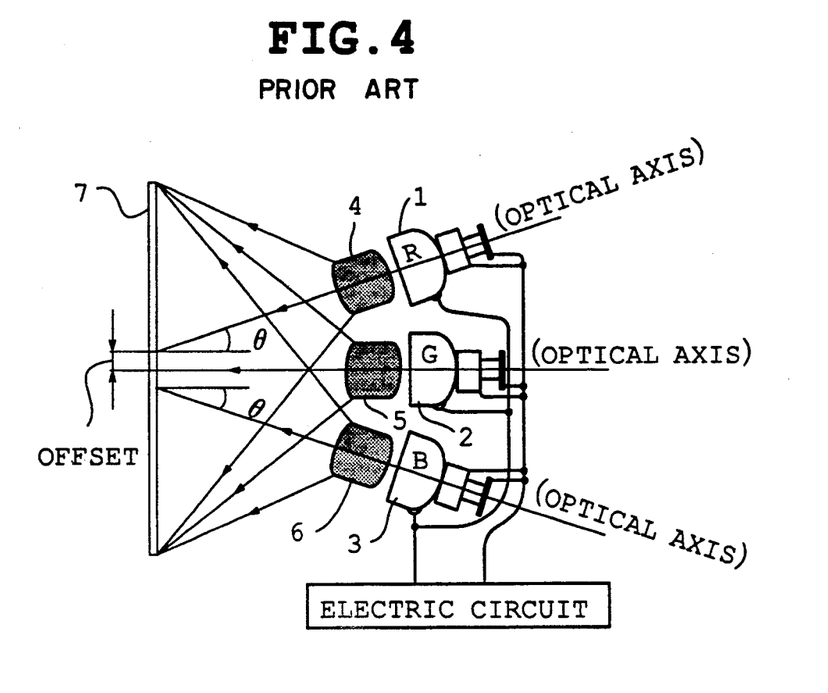
FIG. 4 is a schematic diagram for explaining a principle of a color projection television system.

Referring to FIG. 4, a color projection television system has three color picture tubes 1, 2 and 3 each lined with phosphoric material for producing one of the three primary colors, red, green and blue. The color beams are projected on a screen 7 through projection lenses 4, 5 and 6 which are provided in front of the picture tubes 1, 2 and 3 so that a pictorial image appears on the screen 7.

In the system, since each optical axis of the red and green beams are projected on the screen 7 at an incident angle $\theta$, a keystone distortion which results in a trapezoidal image occurs. In order that the distortion may be so corrected as to adjust convergence of the red, green and blue beams on the screen 7, the red and blue beams emitted from the picture tubes 1 and 3 are distored in a direction opposite to that of the distortion. In addition, a phosphoric screen of the red and blue picture tubes 1 and 3 are slightly tilted to improve focusing.

Figure 5:
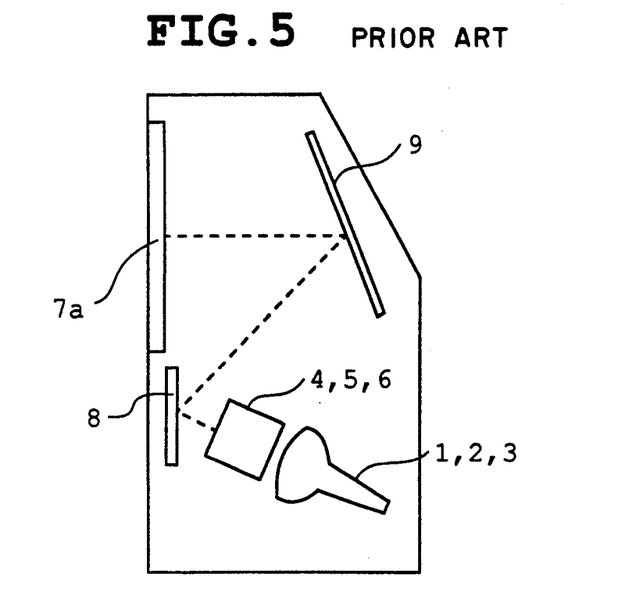
FIG. 5 is a schematic diagram of a conventional rear projection television system.

A rear projection system which is one of the systems of the projection television is shown in FIG. 5. The color picture tubes (CRTs) 1, 2 and 3 for producing red, green and blue colors produces a pictorial image which is expanded by projection lenses 4, 5 and 6. The image is reflected on opposing reflecting mirrors 8 and 9 and reproduced on a light-transmissible screen 7a.

Figure 6:
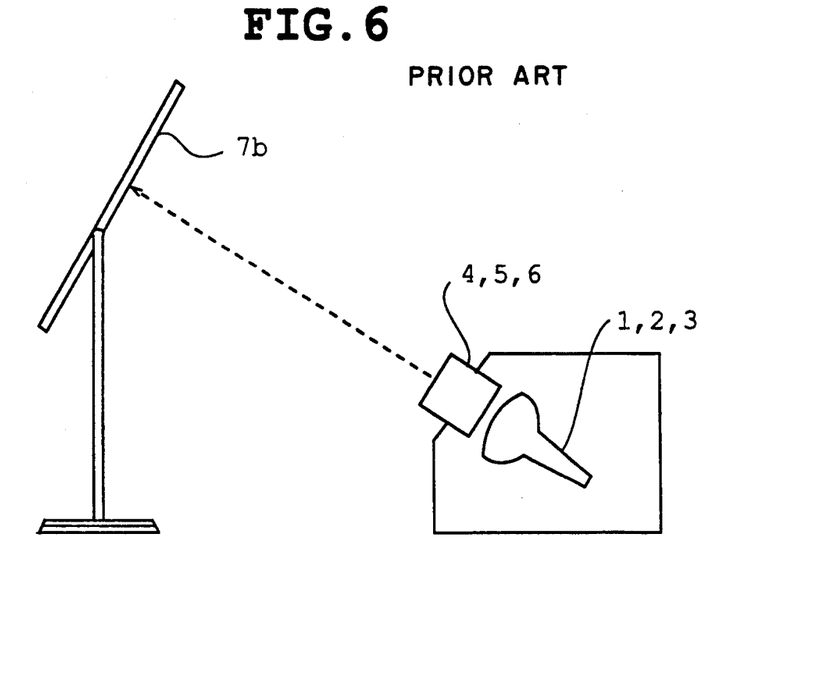
FIG. 6 is a schematic diagram of a conventional front projection television system.

FIG. 6 shows another projection television system where the image is reproduced on a reflecting screen 7b from the front thereof.

Figure 7:
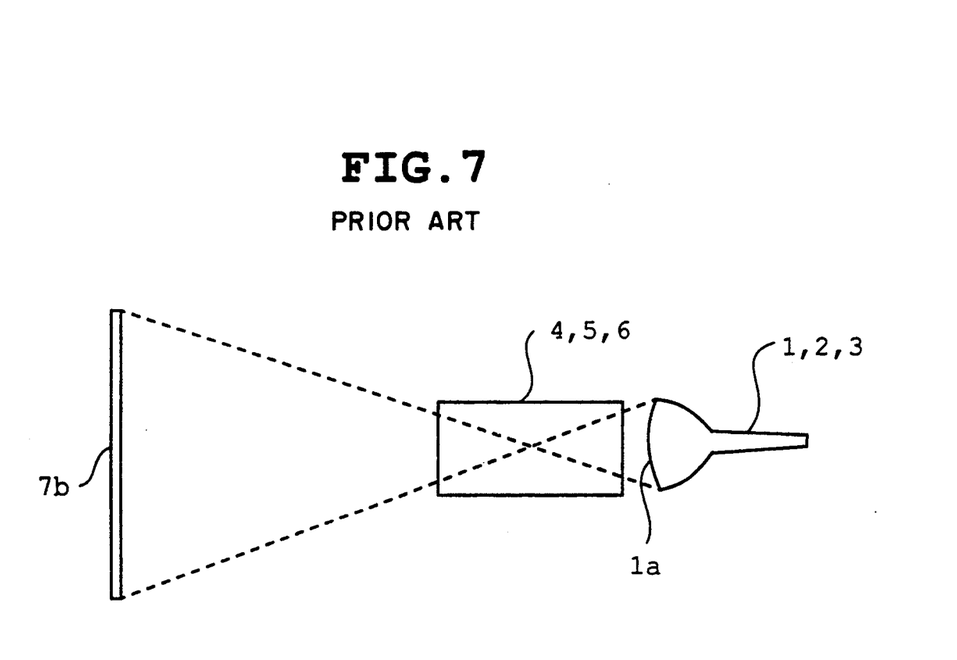
FIGS. 7 and 8 show other projection television system.
Figure 8:
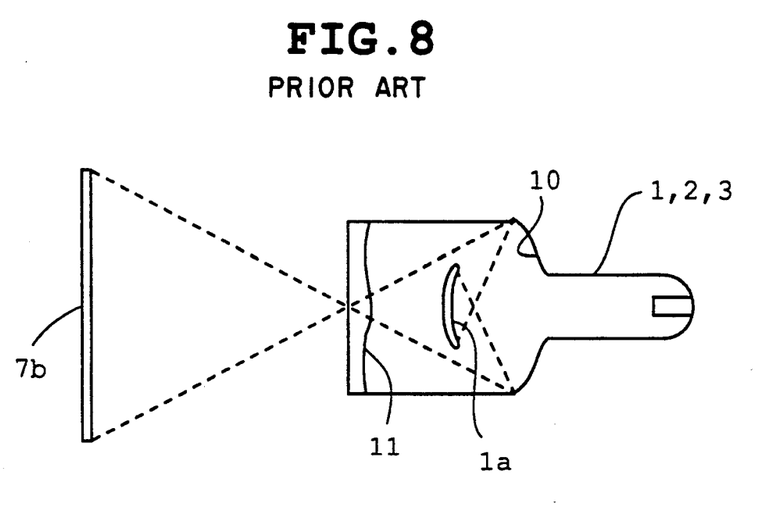

There are other types of projection system such as a refraction system shown in FIG. 7 and a reflection system shown in FIG. 8 dependent on the type of color picture tubes 1. In the refraction system, each of the lenses 4, 5 and 6 is provided in front of a fluorescent screen 1a of the respective picture tubes 1, 2 and 3. The lenses 4, 5 and 6 expand and reproduce the image on the reflecting screen 7b.

To the contrary, in the reflection system, each of the picture tubes 1, 2 and 3 has a fluorescent screen 1a and a reflecting mirror 10 provided in the tube. The image reflected on the reflecting mirror 10 is expanded through a Schmidt lens 11 and reproduced on the reflecting screen 7b.

In accordance with the rear projection system shown in FIG. 6, since the picture tubes 1, 2 and 3 and the lenses 4, 5 and 6 can be disposed adjacent the screen 7b, the television system can be reduced in size. The light-transmissible screen 7a is made of a material having a high light transmittance, such as a Fresnel lens and a lenticular sheet.

In the projection color television system, where there are three picture tubes for red (R), green (G) and blue (B), white balance is obtained by adjusting ratio of light between the tubes into red light of 30%, green light of 59%, and blue light of 11% at the production of the receivers. However, the fluorescent screen 1a of the picture tubes has a low luminous efficacy particularly for blue. Accordingly, in order to maintain the balance with the other colors, current supplied to the blue picture tube is increased. Thus the joule heat caused by the current heats the screen of the blue picture tube, thereby quickly deteriorating it.

Hence, as the screen of the blue picture tube deteriorate with time, the luminous efficacy of the blue light is further decreased. As a result, the quantities of red and green lights relatively increases. The picture on the screen 7 will thus gradually assume a yellowish color. The color can be corrected by manipulating a dial for controlling the color balance. However, the adjusting operation is complicated.

Figure 9:
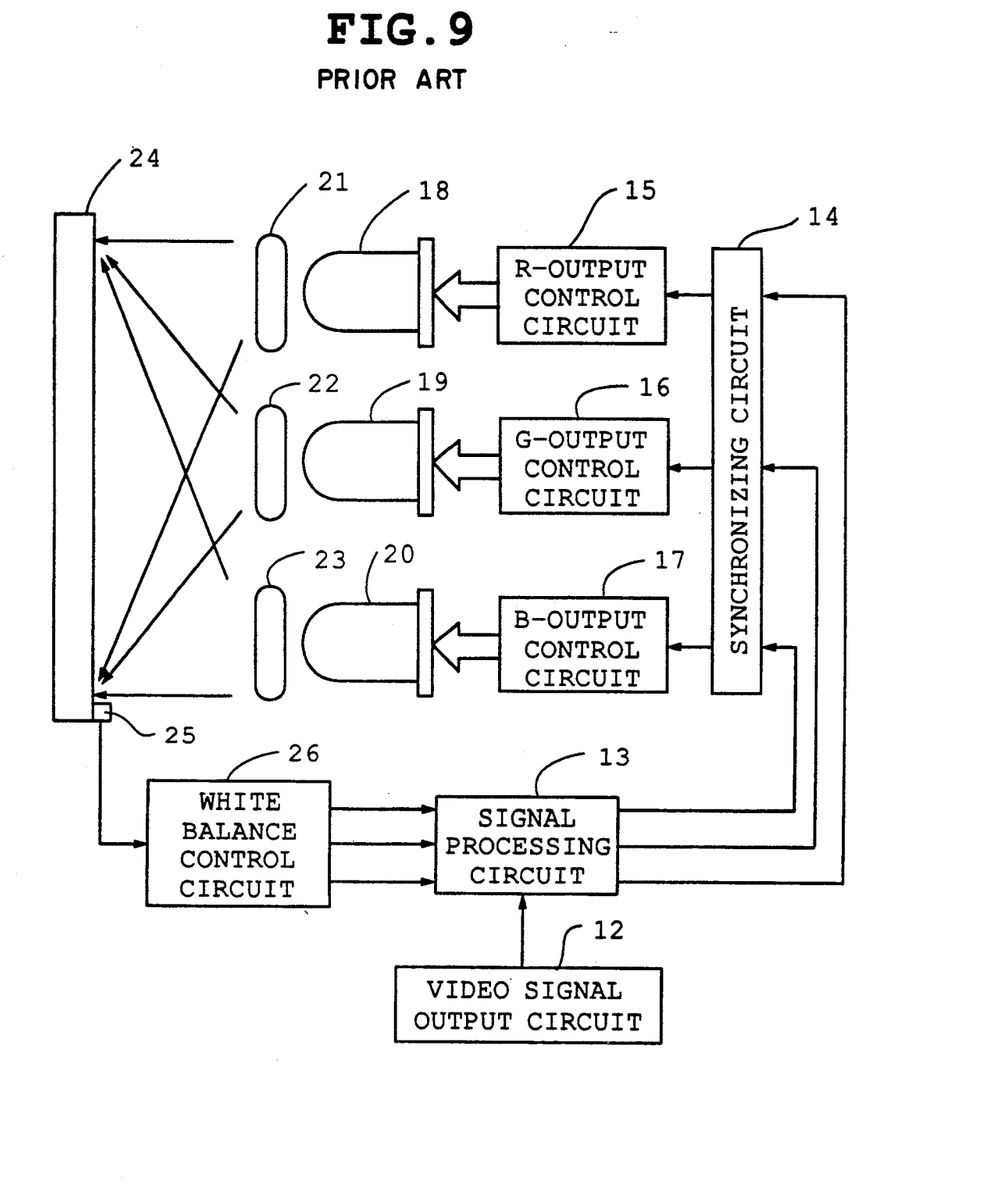
FIG. 9 is a block diagram of a conventional white balance control system.

In order to solve the problem, there is proposed a white balance control system which is shown in FIG. 9. The control system comprises a video signal output circuit 12, a signal processing circuit 13, a synchronizing circuit 14, and color output control circuits 15, 16 and 17. The signal processing circuit 13 produces red, green and blue video signals in accordance with the output signal of the output circuit 12. The synchronizing circuit 14 controls the projection timing of the video signals applied to the control circuits 15 to 17 to prevent deflection of color and decrease of resolution. The video signals are applied to the R-output control circuit 15, G-output control circuit 16 and B-output control circuit 17, the output signals of which are fed to respective picture tubes 18, 19 and 20 so as to control the light emitting operation thereof. As a result, each of the picture tubes 18, 19 and 20 produces an image which is projected on to a light-transmissible screen 24 through a corresponding one of projection lenses 21, 22 and 23.

Light quantity sensors 25 are provided on the screen 24, for example at the four corners of the screen where the pictorial image is not affected, to detect the quantity of light projected on the light transmissible screen 24.

The output signals of the light quantity sensors 25 are fed to a white balance control circuit 26 where a signal detected by the light quantity sensor 25 is split into red, green and blue components. The ratio of quantities of light corresponding to each components is calculated and compared with a reference light quantity ratio. Intensity of beam of each primary color is adjusted in accordance with the comparison so as to reproduce appropriate white on the screen in a wide range from high luminance to low luminance.

In the system, since the control is based on the signals corresponding to split color components, the accuracy of the adjustment depends largely on the quantity of a light splitting device. Moreover, the light quantity sensors 25 provided on the screen 24 are apt to be affected by outer light coming in from outdoors. More particularly, when the lights have poor luminance, the sensors 25 cannot accurately detect the quantity of light.

SUMMARY OF THE INVENTION

The object of the present invention is to provide a white balance adjusting system where the above-described problem is solved so as to constantly provide a pictorial image in appropriate color.

According to the present invention, there is provided a white balance adjusting system for a color television system having a color control circuit and projecting means for projecting beams of each color on to a screen.

The system comprises sensors disposed adjacent each projecting means for detecting quantity of each primary color light, calculator means for calculating each level of the detected quantities of the primary color lights, a memory storing reference levels for obtaining a white balance, comparing means for comparing the calculated level with the reference levels, correcting means for correcting a deviation of each calculated level from the reference level so as to coincide with the reference level.

In an aspect of the invention, the calculator means calculates the difference between levels of red and green and difference between levels of blue and green, and the comparing means are arranged to compare each difference with a respective reference value.

The other objects and features of this invention will become understood from the following description with reference to the accompanying drawings.

DETAILED DESCRIPTION OF THE PREFERRED EMBODIMENT

Figure 1:
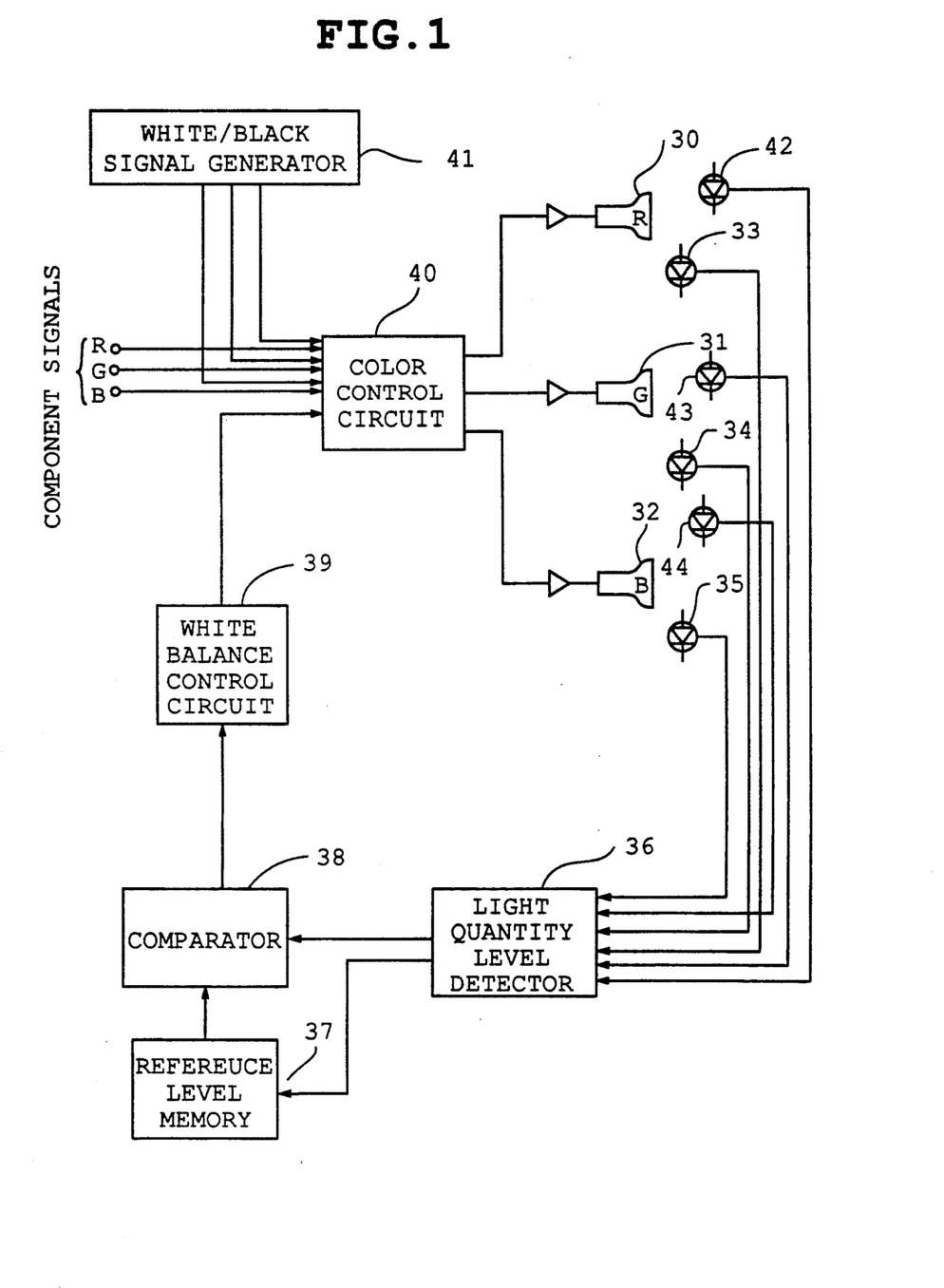
FIG. 1 is a block diagram of a white balance adjusting system for a projection display television receiver.
Figure 2:
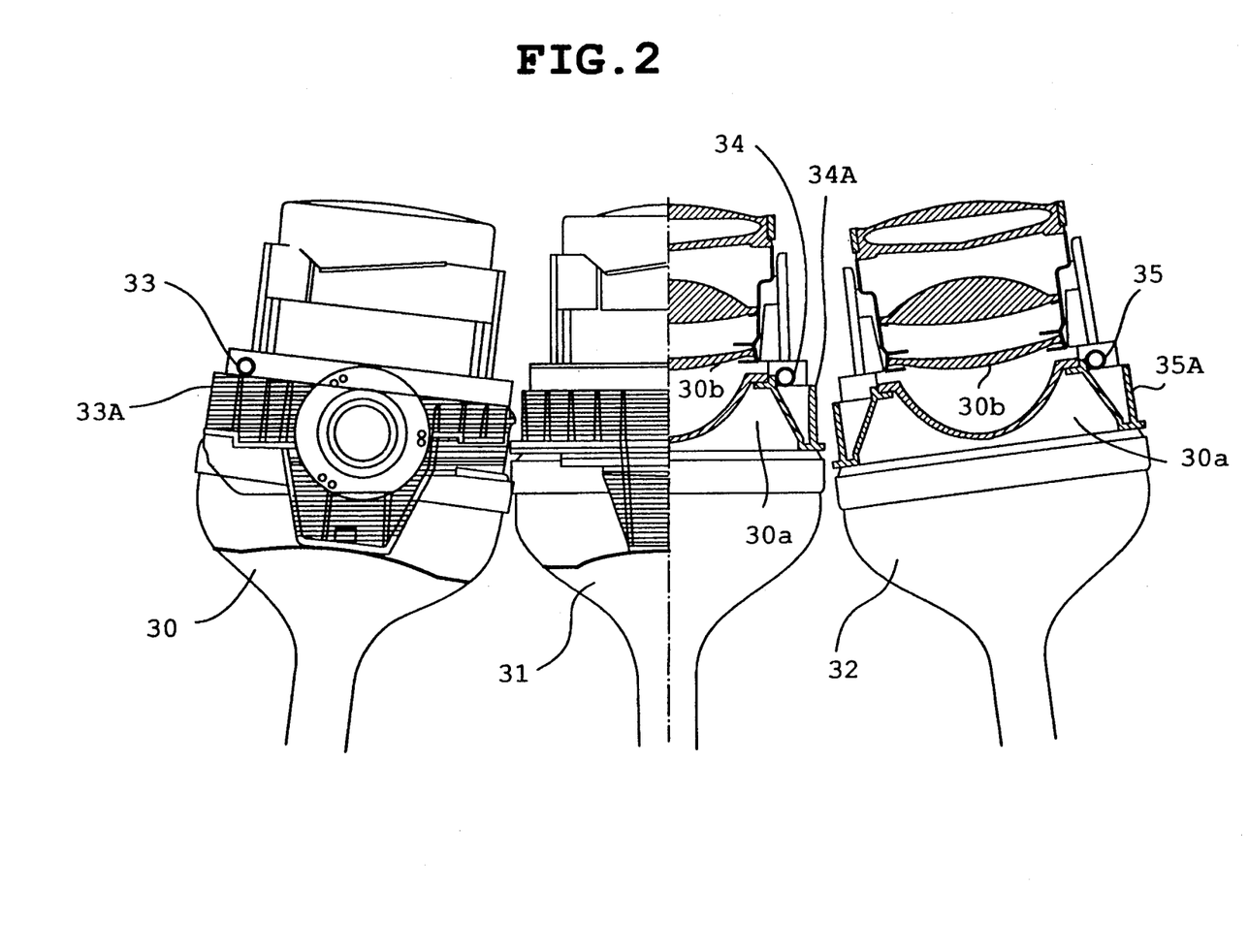
FIG. 2 is a partially cut-away elevational view of CRTs provided in the projection display television system.

Referring to FIG. 1, a television system to which a white balance adjusting system of the present invention is applied has three CRTs (color picture tubes) 30, 31 and 32. Each CRT is lined with phosphoric material that produces red, green or blue primary color. The CRTs 30, 31 and 32 are provided with respective sensors 33, 34 and 35, each comprising a photodiode for detecting quantity of light emitted from the corresponding CRT. As shown in FIG. 2, each of the sensors 33, 34 and 35 is disposed, for example on a periphery of a coupler 33A (34A, 35A) where the light is most liable to leak. Each coupler holds coolant 30a therein and supports a plastic convex lens 30b.

The outputs of the sensors 33, 34 and 35 are applied to a light quantity level detector 36 where a level of the quantity of light in each primary color beam is detected. The light quantity levels are applied to a comparator 38 where each of the levels is compared with a predetermined reference light quantity level stored in a reference level memory 37.

The output of the comparator 38 is applied to a white balance control circuit 39 which applies a control signal to a color control circuit 40. The color control circuit 40 controls the CRTs 30, 31 and 32 in accordance with the control signal.

Figure 3A:
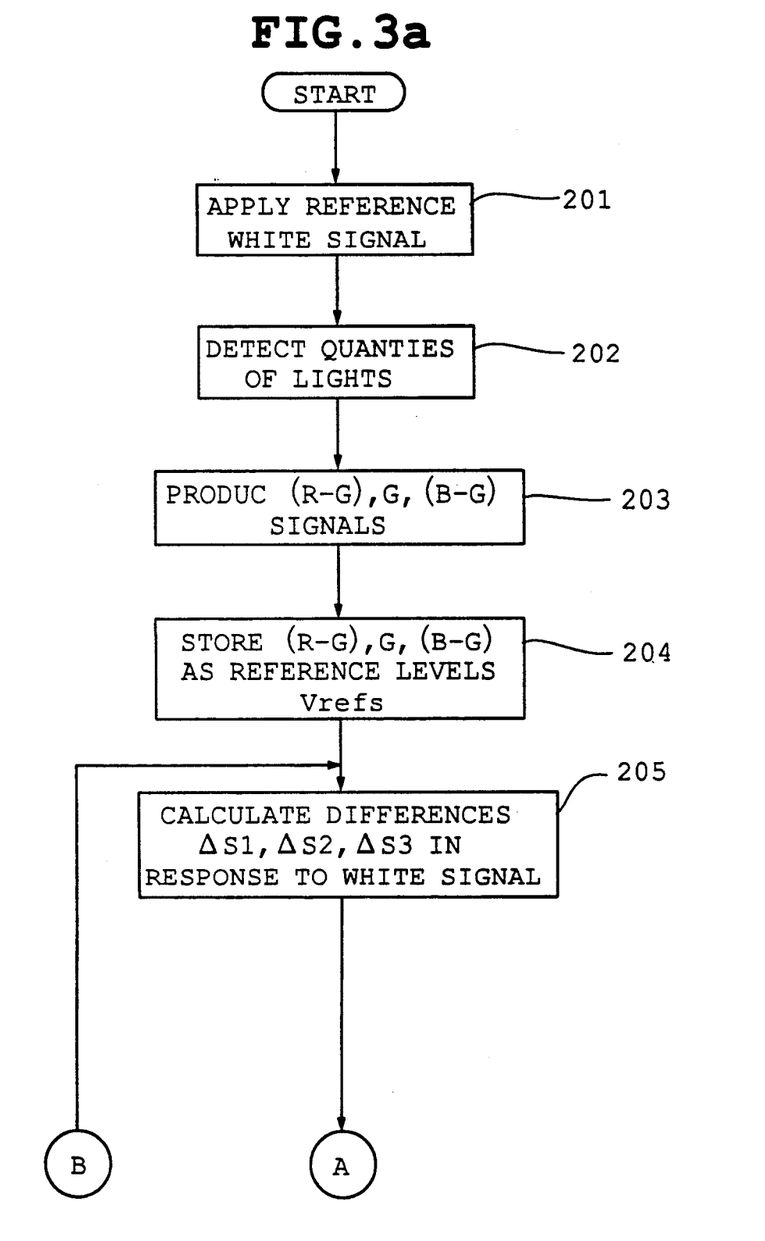
FIGS. 3a and 3b show a flowchart showing the operation of the white balance control system.
Figure 3B:
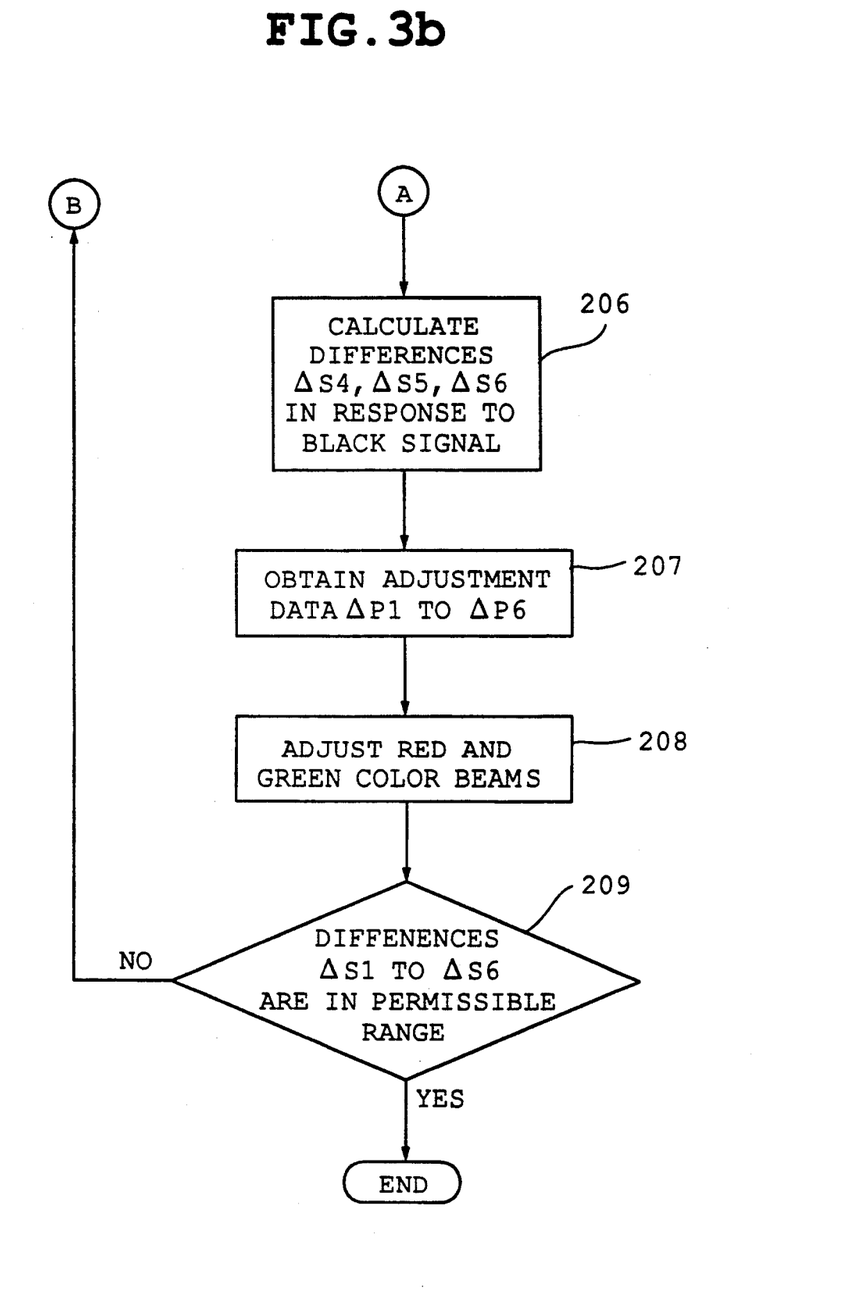

The operation of the white balance control system is described with reference to FIGS. 3a and 3b.

An operation for setting a reference light quantity level Vref for each primary color is described. When a reference white signal comprising red, green and blue is applied from a while/black signal generator 41 to the color control circuit 40 at a step 201. The CRTs 30, 31 and 32 are operated to emit respective color beams to produce a white image on a screen. Quantities of color lights are detected by standard sensors 42, 43 and 44 provided in a factory. The white balance of the image on the screen is manually controlled. The sensors 42, 43 and 44 detect the quantities of standard color lights when an appropriate white balance is obtained (step 202).

At a step 203, the light quantity level detector 36 determines levels R, G and B of the quantities of standard red, green and blue lights detected by the sensors 42, 43 and 44. The light quantity level detector 36 further calculates the difference between the red level and green level (R-G) and the difference between the blue level and the green level (B-G), and produces output signals dependent on the difference and an output signal of the green level, which are represented as (R-G) signal, (B-G) signal and G signal. These signals are converted into digital signals by an A/D converter and stored in a reference level memory 37 at a step 204, as reference level Vrefs for the values (R-G), G and (B-G).

The values of the reference levels Vrefs vary dependent on the positions of the CRTs 30, 31 and 32 and the sensors 42, 43 and 44. If the values largely deviate from a center of a range of the A/D converter, the gains of the R and B signals are adjusted before storing the levels thereof as the reference levels Vrefs.

In an operation for automatically controlling the white balance, the same white signal as the above described white signal is applied from the white/black signal generator 41 to the color control circuit 40 at a step 205. The CRTs 30, 31 and 32 emit respective color beams to produce a white image. Quantities of color lights are detected by sensors 33, 34 and 35. The light quantity level detector 36 determines levels R, G and B of the quantities of red, green and blue lights. The light quantity level detector 36 calculates the difference (R-G) between the red level and green level and the difference (B-G) between the blue level and the green level. These values are fed to the comparator 38. The comparator 38 calculates differences $\Delta S1$, $\Delta S2$ and $\Delta S3$ between the reference levels Vrefs and the respective actual light quantity levels (R-G), G and (B-G).

A black signal having a brightness of one-hundredth of that of the white signal is fed from the white/black signal generator 41 to the color control circuit 40. Levels (R-G), G and (B-G) at the black signal are produced at the light quantity level detector 36 in accordance with the actual quantities of light of the three primary colors. The values of (R-G), G and (B-G) are compared at the comparator 38 with the reference levels Vref stored in the reference level memory 37 to obtain differences $\Delta S4$, $\Delta S5$ and $\Delta S6$ between the actual values and the reference values (step 206).

At a step 207, the white balance control circuit 39 obtains adjustment data $\Delta P1$ to $\Delta P6$ in accordance with the differences $\Delta S1$ to $\Delta S6$. The adjustment data $\Delta P1$ to $\Delta P6$ are fed to the color control circuit 40 which accordingly adjusts the contrast and brightness between the red and blue colors and the drivings and cut-offs of the red and blue color beams. The procedures of steps 205 to 208 are repeated until it is determined at a step

209 that each of the differences ΔS1 to ΔS6 of levels is within permissible range.

Thus, in accordance with the present invention, the quantities of red, green and blue lights are directly detected by the sensors 33, 34 and 35 so that exact levels thereof can be determined. Hence the levels of the three primary colors are accurately controlled. Since the sensors are provided adjacent the respective picture tubes, the quantities of light can be accurately detected although the luminance of the lights may be low. Moreover, the results are not affected by the outer light coming from out of doors.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A white balance adjusting system for a color television system having three projecting means for projecting beams of three primary colors, and a color control circuit for controlling outputs of the three projecting means, the adjusting system comprising:

light quantity detecting means provided adjacent to each of said projecting means for detecting a quantity of light output from each projecting means;

memory means for storing three reference quantities of respective color lights for obtaining a white balance;

comparing means for comparing each detected quantity of the color light with the reference quantity, thereby determining a difference therebetween;

control means for operating the color control circuit so as to reduce the difference determined by the comparing means to a predetermined value.

2. The system according to claim 1 further comprising detector means for detecting a difference between quantities of red and green and a difference between quantities of blue and green, and wherein the comparing means compare each difference with a respective reference values.

3. A white balance adjusting system according to claim 1, wherein said light quantity detecting means comprises a photodiode corresponding to each of said three projecting means.

4. A white balance adjusting system as recited in claim 1, further comprising converter means coupled to said light quantity detecting means for converting said detected quantity of light from an analog level to a digital signal.

* * * * *